J. S. WILLIAMS.
RESILIENT WHEEL EQUIPMENT.
APPLICATION FILED APR. 15, 1913.
1,318,711.
Patented Oct. 14, 1919.
3 SHEETS—SHEET 1.
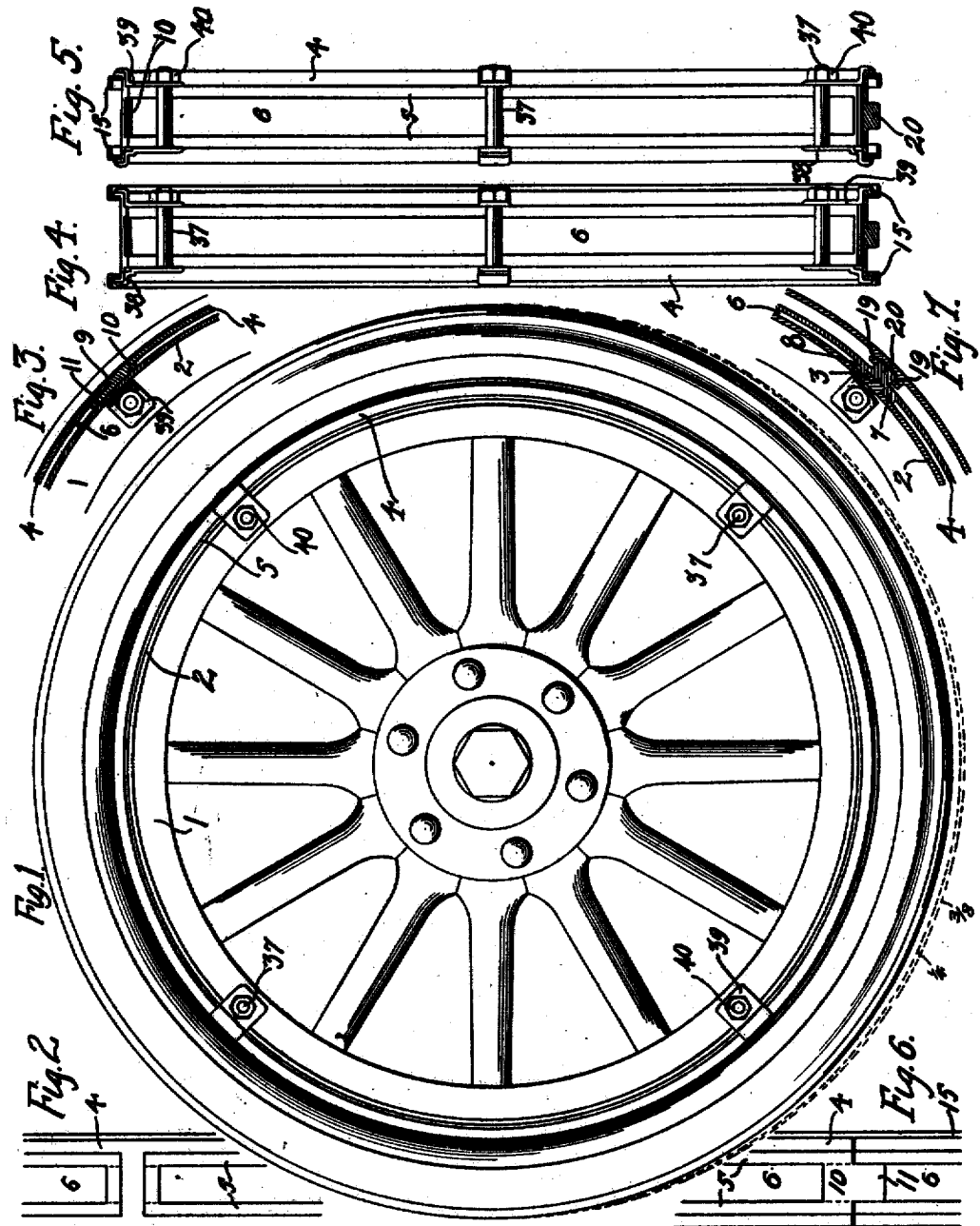

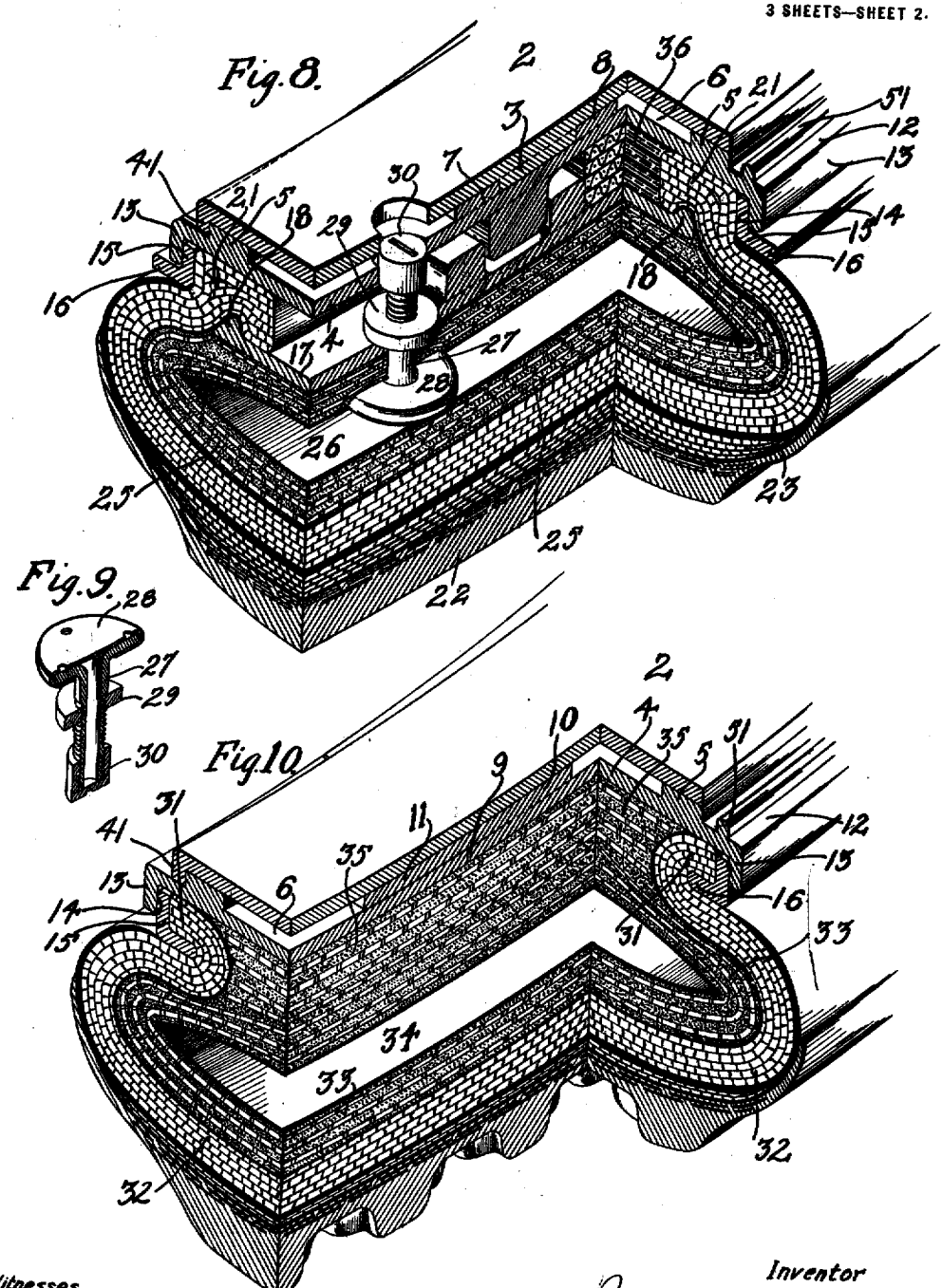

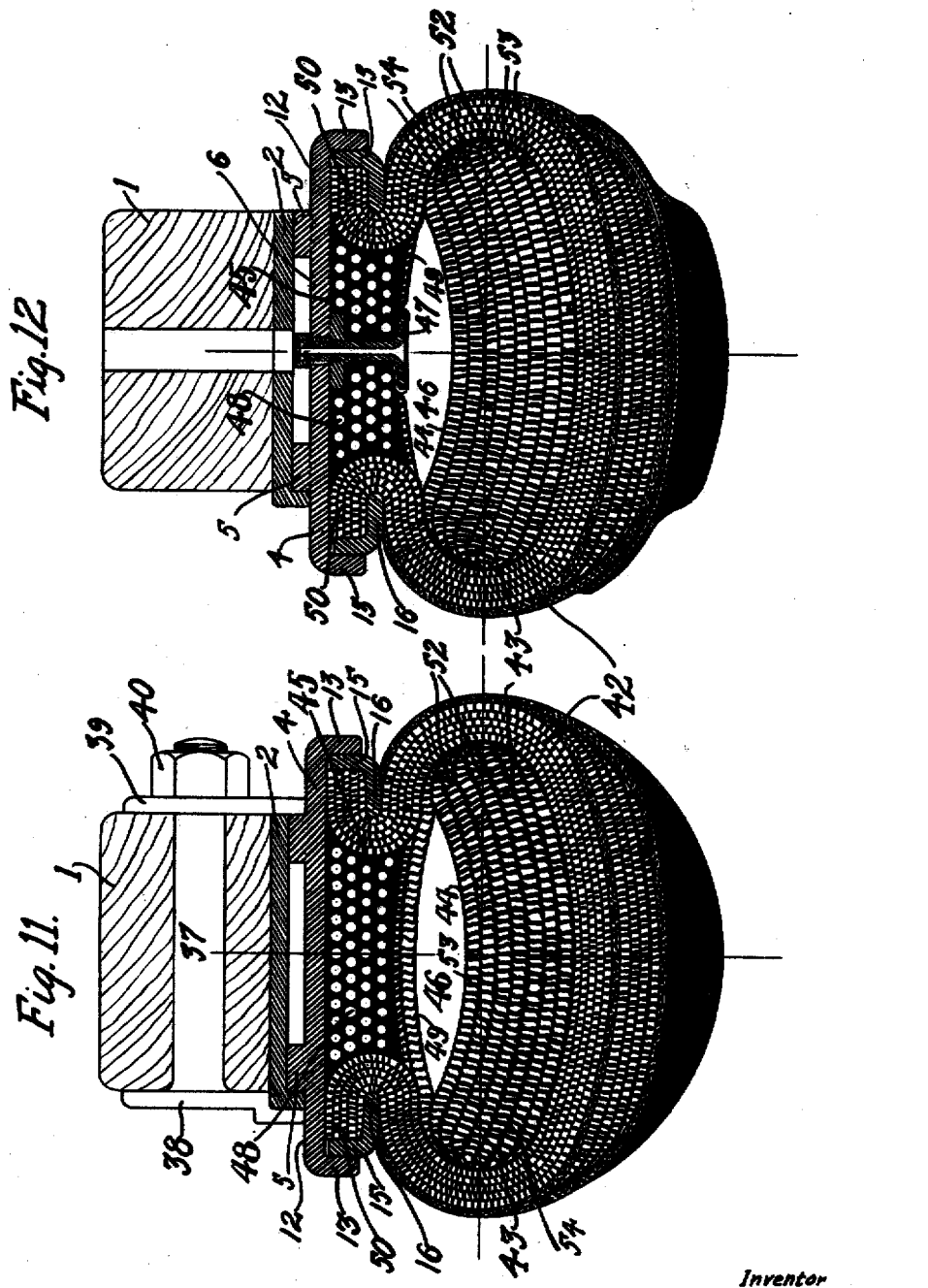

UNITED STATES PATENT OFFICE.

JOSEPH S. WILLIAMS, OF RIVERTON, NEW JERSEY.

RESILIENT WHEEL EQUIPMENT.

1,318,711.   Specification of Letters Patent.   Patented Oct. 14, 1919.

Application filed April 15, 1913. Serial No. 761,195.

*To all whom it may concern:*

Be it known that I, JOSEPH S. WILLIAMS, a citizen of the United States, residing at Riverton, in the county of Burlington, State of New Jersey, have invented a new and useful Resilient Wheel Equipment, of which the following is a specification.

This invention in its broad and generic scope consists of a novel resilient wheel equipment and method and means employed therein, to provide stability in the respective parts and in the unit of structure and universality and constancy of resilient load supporting and balancing capacities and constancy of resilient equilibrium between thrusts and reactions.

This invention in its broad and generic scope further relates to a novel resilient wheel equipment in which an inner annular, transversely divided member of an outer, resilient, annular body cofits, interlocks, and operates contractively upon the peripheral seating of a felly band of a wheel, and is in constant compressive engagement with strongly reinforced retroactive yielding seating parts operating against circumferentially inextensible parts in such seating whereby such construction provides for the inner seating member of the annular body being expanded sufficiently against the peripheral and retroactively compressible part of the seating to effect the cofitting, placement, and alinement of the inner member upon the outer peripheral part of the felly band of the wheel, having a circumferential length to provide a positive contractive fit and grip thereon. By such means the equipment will secure a practical uniformity or universality of reliable seating with the felly band of the wheel, and for all parts of the annular body outwardly thereof secured to such seating construction, so that side clips or radial belts or any suitable means will prevent lateral movement and positively prevent displacement, otherwise than when desired, to dismount the construction from the wheel whereby a unit construction is provided which will be absolutely stable and reliable in service.

It is a further object of this invention to provide a novel resilient wheel equipment in which an annular body of resilient construction is mounted upon removable rings or bands, which are supported and maintained in position and firmly secured by and between annular flanges projecting from the sides outwardly of an annular transversely divided member of proper width to secure the removable rings or band in alinement approximately over the vertical axis of curvatures of approximately one hundred and eighty degrees or more in the sides of the resilient annular body, with the center of such annulus on the vertical axial line of the resilient annular body, outwardly thereof, having stable resilient support across the body and in the curvatures at sides and retroactively resilient in the field of construction, with tensile support therefor inextensible in the ring seating at the side and along the transverse portions of the outer peripheries thereof and about the curvatures of approximately one hundred and eighty degrees or more laterally from the vertical axis of such curvature to the outer transverse portions and across the body with any desired increase of tensile capacities in such fields of planes, or in curvatures relatively thereto, providing an altitude in construction in balancing ratio to definite ranges representing any fractional part of resilient movements in balancing ratios to a range of preferably approximately one-quarter to three-eighths of an inch, and not exceeding one-half of an inch on the line of the vertical axis of thrust and otherwise in balancing ratios to approximately twenty to twenty-five degrees of length of tread contact along the plane of road.

It is a further object of my invention to provide a novel construction of a felly band, a coöperative annulus and transversely divided member preferably adapted to interlock with a driving fit on the felly band, and clencher rings coöperating with the said member, all of which may be readily manufactured by a rolling process and be readily formed and equipped to provide for the parts being readily assembled in coöperative relationship to secure stable support for an annular body of resilient construction having its seating parts adapted for such construction and preferably having the construction outwardly of such seating with inherent capacities to resiliently support and balance load with constancy of resilient equilibrium between thrusts and reactions and with definite ranges of resilient movements preferably of approximately three-eighths of an inch on the vertical line of thrust with or without means to vary the internal resilient resistance, balance, and capacities of the annular body.

My present invention may be employed in conjunction with any desired resilient tire construction, having suitable terminals, but is especially designed to be employed with transversely elongated constructions provided in the outer part with one or more tensile belts having a tensile capacity largely in excess of load and provided with an inner cushioning belt which provides for a predetermined range of resilient altitude under a determined load. The construction of the cushioning belt may provide for the use of fluid or compressible content, which will provide resiliency in the entire annular portion and not locally as in the ordinary types of pneumatic, cellular or solid tire constructions. The wheel equipment, as herein defined, provides normally a constant capacity to support a predetermined load due to the fact that the side walls of the construction have constant support through the medium of the sides of the cushioning belt.

With the above and other objects in view, which will more clearly hereinafter appear in the detail description, my invention consists of a novel resilient wheel equipment, which is adapted to be employed in conjunction with solid, cellular, or resilient tire construction.

It further consists of other novel features of construction, all as will be hereinafter fully set forth.

For the purpose of illustrating my invention, I have shown in the accompanying drawings preferred embodiments which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a wheel equipment, embodying my invention in assembled condition with respect to a wheel.

Fig. 2 represents a plan view of a portion of Fig. 1.

Fig. 3 represents a section of Fig. 6.

Figs. 4 and 5 represent sectional views of annuli embodying my invention and certain of their adjuncts.

Fig. 6 represents a plan view of a portion of an annulus employed in my construction.

Fig. 7 represents a sectional view of a portion of my device, showing certain details of my construction.

Fig. 8 represents in section a perspective view of a wheel equipment.

Fig. 9 represents a sectional view of a portion of Fig. 8.

Fig. 10 represents in section a perspective view of another embodiment of my invention.

Figs. 11 and 12 represent respectively sectional views of other embodiments of my invention.

Similar numerals of reference indicate corresponding parts in the figures.

Referring to the drawings:

In a copending application, I have described and broadly claimed a novel construction of resilient wheel equipment, wherein an annulus is secured in compressive engagement with the compressible terminals of a resilient tire construction, such terminals being thereby rendered circumferentially inextensible.

In my present invention instead of employing a single annulus, I provide an annulus in conjunction with which I employ clamping or locking rings which serve to lock the terminals of the tire in compressive engagement with the annulus.

Referring first to Figs. 1 to 10 inclusive, 1 designates a felly to which is secured, in any desired or conventional manner, a band 2, which has welded, riveted or otherwise secured thereto a locking lug 3. The band 2 is preferably formed by a rolling process, and the lug 3 secured thereto in the manner described.

4 designates an annulus, which is also adapted to be formed by a rolling process, and has near each side on its inner face, the inwardly extending flanges 5, which form a central annular channel 6. In order to form means to interlock with the lug 3 of the band 2, I weld, rivet or otherwise secure to the annulus 4, the lugs 7 and 8 which are preferably located in the channel 6. The annulus 4 is transversely divided as indicated at 9, and I weld, rivet or otherwise secure to one end of the annulus a plate 10, having an overlapping portion 11 which extends into the channel 6, on the other end of the annulus 4. The outer face of the annulus 4 extends laterally as indicated at 12, and at the sides is outwardly deflected, as indicated at 13, to form at each side an inner shoulder 14, which serves to retain in position rings 15, which have an angular contour, it being noted that these rings may be inserted, as in Fig. 8, with the base flange 16 extending outwardly or as in Fig. 10 with the base flange extending inwardly depending upon the construction of the tire construction in conjunction with which they are employed.

The under face of the base flange 16 is preferably substantially flat with curvature at the side as desired.

17 designates an annular band having at its sides interlocking portions 18, and said annular band 17 has connected therewith, in any desired manner, such as by welding or riveting, lugs 19, as seen in Fig. 7, which are adapted to interlock with a lug 20 secured to the annulus 4 in any desired manner, such as by welding or riveting, it being understood that in my present application the felly band 2, the annulus 4, and the annular band 17 are adapted to be formed by a rolling operation, and that the overlapping or interlocking means employed would be secured thereto preferably by welding such parts to the members by which they are carried.

21 designates terminals of a tire construction, a novel type of tire being shown in the present instance, which consists of an outer tread portion 22 within which is a tensile belt 23, of any predetermined tensile strength and this tensile belt incloses a cushion 25, which, if desired, may be provided with an annular opening 26 adapted to receive fluid under pressure, through a valve 27 having an enlarged head 28 which is located within the opening 26 to maintain in proper relation with respect to the annular band 17 by means of a nut 29 in engagement with the threaded stem of the valve.

30 designates a removable cap which preferably terminates beneath the outer face of the felly band 2, but which, if desired, may extend therethrough and also through the felly 1.

Referring now to the embodiment seen in Fig. 10, the construction of the felly band 2 and the annulus 4 and the manner of interlocking such parts is similar to the manner already described with reference to Fig. 8, and I have therefore identified corresponding parts by similar reference characters, the main difference between these two figures being that a different type of tire construction is shown and the base flanges 16 extend laterally inwardly instead of outwardly.

31 designates the terminals of the resilient tire constructions, which form a part of a tension belt 32, having any desired tensile capacity therein and adapted to inclose a cushion 33, preferably provided with a spacement 34.

35 designates a layer of filling material which may be connected with or detachable from the cushion 33, and which serves to receive the lateral compression on the terminals formed by the clencher rings 15.

It will be understood that the space between the annular band 17 and the annulus 4, seen in Fig. 8, is preferably provided with a filling 36, of any desired material, for example, rubber and fabric which will prevent any leakage into the construction at the meeting points of different parts.

As will be understood by Figs. 1, 4 and 5 I provide bolts 37 which pass through the felly 1, and the head 38 of a bolt, extends downwardly to engage the side of a flange 5, and if desired can be extended along the side of the outwardly extending flange 13, of the annulus 4, although in practice the head of the bolt 37 would preferably only extend in this manner at the line of division 9 of the annulus 4.

39 designates a clip adapted to engage the wall of a flange 5 on the opposite side of the construction, in a manner similar to that just described with respect to the head 38, and any relative lateral movement of the annulus 4 and the felly band 2 with respect to the felly is positively prevented, it being understood that a nut 40 is provided for engagement with a bolt 37. In practice, I preferably provide the felly band 2 with an outwardly extending flange 41 which serves to aline the annulus 4 with respect to the felly, and as a positive abutment to prevent relative lateral movement of the annulus with respect to the felly band, it being understood that movement in the other direction is prevented by means of the clip 39. The head 38 of the bolt 37 is preferably offset in order to extend over the side of the flange 41.

Referring now to the embodiments seen in Figs. 11 and 12, the construction of the felly band 2, the annulus 4, and the locking rings is similar to that already described with reference to other figures of the drawing, and I have therefore given such parts the same reference numerals. The locking rings in Figs. 11 and 12 act as clencher rings.

In this embodiment, I have shown a type of resilient construction wherein is employed within the tensile belt 42 a cushion insert 43, which is removable if desired and the inner face of this insert is curved as at 44, to form with the inner face of a layer of filling 45 a spacement 46, which may be filled with fluid under pressure through the valve 47 which corresponds in construction to that seen in Figs. 8 and 9, but which is secured with respect to the annulus 4, in a different manner. The layer of filling 45 is cellular, as indicated at 48, and the inner face thereof is curved, as indicated at 49, and formed by a layer of fabric and rubber. The terminals 50, of the resilient tire construction are in compressive engagement with the clencher rings 15 and the annulus 4, it being understood that the filling 45 permits the necessary inward movement of the terminals to permit a clencher ring 15 to be forced into engagement with the inner face of the outwardly extending flange 13 of the annulus 4, in order to lock such terminals in compressive engagement with such annulus.

The annulus 4, if desired, may be provided with an annular groove 51, see Figs. 8 and 10, adapted to receive the clips 39, but in many cases arising in practice the provision of such groove is unnecessary and can be readily dispensed with.

When it is desired to demount the rim or remove the wheel equipment, it is simply necessary to remove the nuts 40 whereupon the clips 39 may be readily removed and the annulus 4 and its adjuncts may be readily removed.

In cases wherein it is simply desirous to remove the resilient tire construction, it is simply necessary to move a locking ring 15 laterally and then outwardly so as to release the same from its engagement with the flange 13 of the annulus 4, whereupon the terminals of the tire will be released and the same can be readily removed. The insert located between the terminals may form a part of the cushion belt, as seen in Fig. 10, or the same, if desired, may be formed of a separate filling layer as will be understood by reference to Figs. 11 and 12.

While in practice I preferably employ an outwardly extending flange on the felly band 2, to positively limit the lateral movement in one direction of the annulus 4, it will be apparent that such flange in many cases arising in practice is unnecessary and may be dispensed with and still be within the broad and generic scope of my invention.

The cushioning field 43 consists of a desired number of layers 52 which are formed of fabric of a comparatively loose weave, through the pores of which rubber 53 extends, it being understood that the sides of each layer of fabric are faced with a layer of rubber 54, of any desired thickness, in order to provide the proper amount of friction material between the different layers of fabric. The rubber extending through the pores of the fabric forms an elastic bond between the respective layers of rubber and fabric, and renders the construction practically impermeable to moisture, as well as resistant to fluid pressure.

It is designed to require a considerable amount of pressure upon the sides of the annular body and otherwise on the rings in placing the annulus on the rings whereby the terminals are securely fixed and relatively immovable therewith when so secured, the resilient cushion being thereby brought into the desired retroactively resilient engagement and support with the tension member throughout the lengths of the curvatures of one hundred and eighty degrees or more at the sides and to any further extent desired across the outer or inner or both outer and inner transverse portions or with the slight curvatures in such portions relatively thereto between such curvatures at the sides.

It is furthermore designed that the terminals and outer seating parts inwardly of the resilient cushion shall be made circumferentially inextensible and firmly secured compressively against such inextensible seating parts by the transversely divided annulus.

It will now be apparent that I have devised a novel and useful construction of a resilient wheel equipment which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In a wheel equipment, a transversely divided annulus with radially projected side flanges, locking rings of angle formation in section, each having a face of one arm coacting with a side flange, and a face of the other arm disposed at substantially right angles to the plane of the wheel with its outer periphery extending substantially concentric with the transverse axis of the tire and forming a support for the tire.

2. In a wheel equipment, a transversely divided annulus with radially projected side flanges, reversible locking rings of angle formation in section, each having a face of one arm coacting with a side flange, and a face of the other arm disposed at substantially right angles to the plane of the wheel with its outer periphery extending substantially concentric with the transverse axis of the tire and forming a support for the tire.

3. In a wheel equipment, a transversely divided annulus with radially projected side flanges, locking rings of angle formation in section, each having a face of one arm coacting with a side flange and a face of the other arm disposed at substantially right angles to the plane of the wheel with its outer periphery extending substantially concentric with the transverse axis of the tire and forming a support for the tire, and a resilient tire having a yielding seating in compressive engagement with said annulus and said rings.

4. In a wheel equipment, a transversely divided annulus with radially projected side flanges, locking rings of angle formation in section, each having a face of one arm coacting with a side flange, and a face of the other arm disposed at substantially right angles to the plane of the wheel with its outer periphery extending substantially concentric with the transverse axis of the tire, a band outwardly of said annulus and connected therewith to prevent relative circumferential movement with respect thereto, and a resilient tire having a yielding seating in compressive engagement between said band, said annulus, and said rings.

5. In a wheel equipment, a transversely divided annulus with radially projected side flanges, locking rings of angle formation in section, each having a face of one arm coacting with a side flange, and a face of the other arm disposed at substantially right angles to the plane of the wheel, and a resilient tire having a yielding seating in compressive engagement with said annulus and said ring and rendered circumferentially inextensible thereby and relatively immovable therewith.

6. In a wheel equipment, a transversely divided annulus with radially projected side flanges, locking rings of angle formation in section, each having a face of one arm coacting with a side flange, and a face of the other arm disposed at substantially right angles to the plane of the wheel with its outer periphery forming a support for the tire, a resilient tire having a yielding seating, and means to maintain said seating in compressive engagement with said rings and said annulus.

7. In a wheel equipment, a transversely divided annulus with outwardly projecting side flanges, an inextensible band outwardly of and spaced from said annulus, locking rings of angle formation, each having a face of one arm engaging a side flange and the face of the other arm disposed at substantially right angles to the plane of the wheel, a resilient tire having a yielding seating between said locking rings, and said band and annulus, and means to maintain the outward expansion of said annulus to compress said seating against said band.

8. In a wheel equipment, a transversely divided annulus having outwardly projecting flanges, locking rings of angle formation, each having a face of one arm contacting with a side flange and the other arm extending at substantially a right angle to the plane of the wheel, a resilient tire having a yielding seating between said annulus and locking rings, and means to effect and maintain the expansion of said annulus to compress said seating between the annulus and the locking rings.

9. In a wheel equipment, a transversely divided annulus having outwardly projecting side flanges, locking rings of angle formation, each having a face of one arm engaging a side flange and the outer periphery of the other arm extending at substantially right angles to the plane of the wheel and forming a bearing face for the tire, a resilient tire having yielding terminal seating parts between said locking rings and annulus, and means to effect and maintain the expansion of said annulus to compress said parts between the annulus and rings.

JOSEPH S. WILLIAMS.

Witnesses:
H. S. FAIRBANKS,
C. D. McVAY.

Copies of this patent may be obtained for five cents each, by addressing the "Commissioner of Patents, Washington, D. C."